(12) United States Patent
Kuroba et al.

(10) Patent No.: US 11,807,332 B2
(45) Date of Patent: Nov. 7, 2023

(54) STRADDLE TYPE VEHICLE

(71) Applicant: HONDA MOTOR CO., LTD., Tokyo (JP)

(72) Inventors: Yoshiyuki Kuroba, Wako (JP); Hiroshi Maeda, Wako (JP); Masashi Hagimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 757 days.

(21) Appl. No.: 16/991,538

(22) Filed: Aug. 12, 2020

(65) Prior Publication Data

US 2020/0369340 A1  Nov. 26, 2020

Related U.S. Application Data

(63) Continuation of application No. PCT/JP2018/011814, filed on Mar. 23, 2018.

(51) Int. Cl.
| | |
|---|---|
| *B62J 45/41* | (2020.01) |
| *B62J 45/42* | (2020.01) |
| *B62J 50/22* | (2020.01) |
| *B62J 27/00* | (2020.01) |
| *B62K 11/02* | (2006.01) |
| *B62J 6/022* | (2020.01) |
| *B62J 40/00* | (2020.01) |

(52) U.S. Cl.
CPC ............... *B62J 45/41* (2020.02); *B62J 6/022* (2020.02); *B62J 27/00* (2013.01); *B62J 45/42* (2020.02); *B62J 50/22* (2020.02); *B62K 11/02* (2013.01); *B62J 40/00* (2020.02)

(58) Field of Classification Search
CPC ... B62J 45/41; B62J 6/022; B62J 27/00; B62J 45/42; B62J 50/22; B62J 40/00; B62K 11/02
USPC ......................................................... 340/427
See application file for complete search history.

(56) References Cited

U.S. PATENT DOCUMENTS

| | | |
|---|---|---|
| 9,746,449 B2 | 8/2017 | Eidel et al. |
| 10,166,909 B2 | 1/2019 | Suzuki et al. |
| 10,562,477 B2 | 2/2020 | Fuchs et al. |
| 2015/0185188 A1 | 7/2015 | Eidel et al. |

(Continued)

FOREIGN PATENT DOCUMENTS

| | | |
|---|---|---|
| CN | 113460205 A * | 10/2021 |
| DE | 102011002894 A1 | 7/2012 |
| DE | 102012106696 A1 | 1/2014 |

(Continued)

OTHER PUBLICATIONS

International Search Report for PCT/JP2018/011814 dated Jun. 5, 2018.

(Continued)

*Primary Examiner* — Omar Casillashernandez
(74) *Attorney, Agent, or Firm* — Thomas | Horstemeyer, LLP

(57) ABSTRACT

A straddle type vehicle includes a front cover configured to cover a front part of the vehicle, and a detecting unit for detecting a situation in front of the vehicle. The detecting unit is arranged behind a central portion of the front cover in a vehicle width direction. A gap is formed between the detecting unit and the front cover in a vehicle longitudinal direction and a viscoelastic member is installed in the gap.

10 Claims, 7 Drawing Sheets

(56) References Cited

U.S. PATENT DOCUMENTS

2017/0327026 A1 11/2017 Suzuki et al.
2019/0161042 A1 5/2019 Fuchs et al.

FOREIGN PATENT DOCUMENTS

| DE | 102019111819 B4 * | 8/2021 | ........... B60Q 1/0023 |
|----|----|----|----|
| JP | 2008110683 A | 5/2008 | |
| JP | 2015140029 A | 8/2015 | |
| JP | 2017039487 A | 2/2017 | |
| JP | 2017202810 A | 11/2017 | |
| JP | 2019048554 A | 3/2019 | |
| WO | 2017221410 A1 | 12/2017 | |
| WO | 2019180939 A1 | 9/2019 | |

OTHER PUBLICATIONS

IPRP for PCT/JP2018/011814 dated Feb. 13, 2020.
German Office Action for DE Patent Application No. 112018007332.7 dated Aug. 19, 2022.

* cited by examiner

STRADDLE TYPE VEHICLE

CROSS-REFERENCE TO RELATED APPLICATION(S)

This application is a Continuation of International Patent Application No. PCT/JP2018/011814, filed Mar. 23, 2018, the entire disclosures of which is incorporated herein by reference.

BACKGROUND OF THE INVENTION

Field of the Invention

The present invention relates to a straddle type vehicle having a front detecting function.

Description of the Related Art

A straddle type vehicle having a function of detecting the existence of a front obstacle or the like and notifying the rider of the detection result has been proposed. For example, Japanese Patent Laid-Open No. 2017-39487 discloses a straddle type vehicle that includes a sensor (front sensing unit) in a headlight unit, and detects an obstacle or the like in front of the vehicle.

In the arrangement of Japanese Patent Laid-Open No. 2017-39487, however, the sensor in the headlight unit is sometimes seen when the vehicle is viewed from the front, and this deteriorates the outer appearance of the vehicle in some cases. When the sensor is installed inside the vehicle as a measure against that, no sufficient front detection range can be obtained in some cases depending on the installation portion.

SUMMARY OF THE INVENTION

It is an object of the present invention to provide a straddle type vehicle capable of detecting the situation in front of the vehicle while avoiding the deterioration of the outer appearance.

According to an aspect of the present invention, there is provided a straddle type vehicle comprising: a front cover configured to cover a front part of the vehicle; and a detecting unit configured to detect a situation in front of the vehicle, wherein the detecting unit is arranged behind a central portion of the front cover in a vehicle width direction, a gap is formed between the detecting unit and the front cover in a vehicle longitudinal direction, and a viscoelastic member is installed in the gap.

Further features of the present invention will become apparent from the following description of exemplary embodiments (with reference to the attached drawings).

DESCRIPTION OF EMBODIMENTS

A straddle type vehicle according to an embodiment of the present invention will be explained below with reference to the accompanying drawings. In each drawing, arrows X, Y, and Z indicate directions perpendicular to each other. The X direction indicates the front-and-rear direction of the straddle type vehicle, the Y direction indicates the vehicle width direction (left-and-right direction) of the straddle type vehicle, and the Z direction indicates the vertical direction. The left and right of the straddle type vehicle are the left and right in the traveling direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases.

<Outline of Straddle Type Vehicle>

Figure 1:
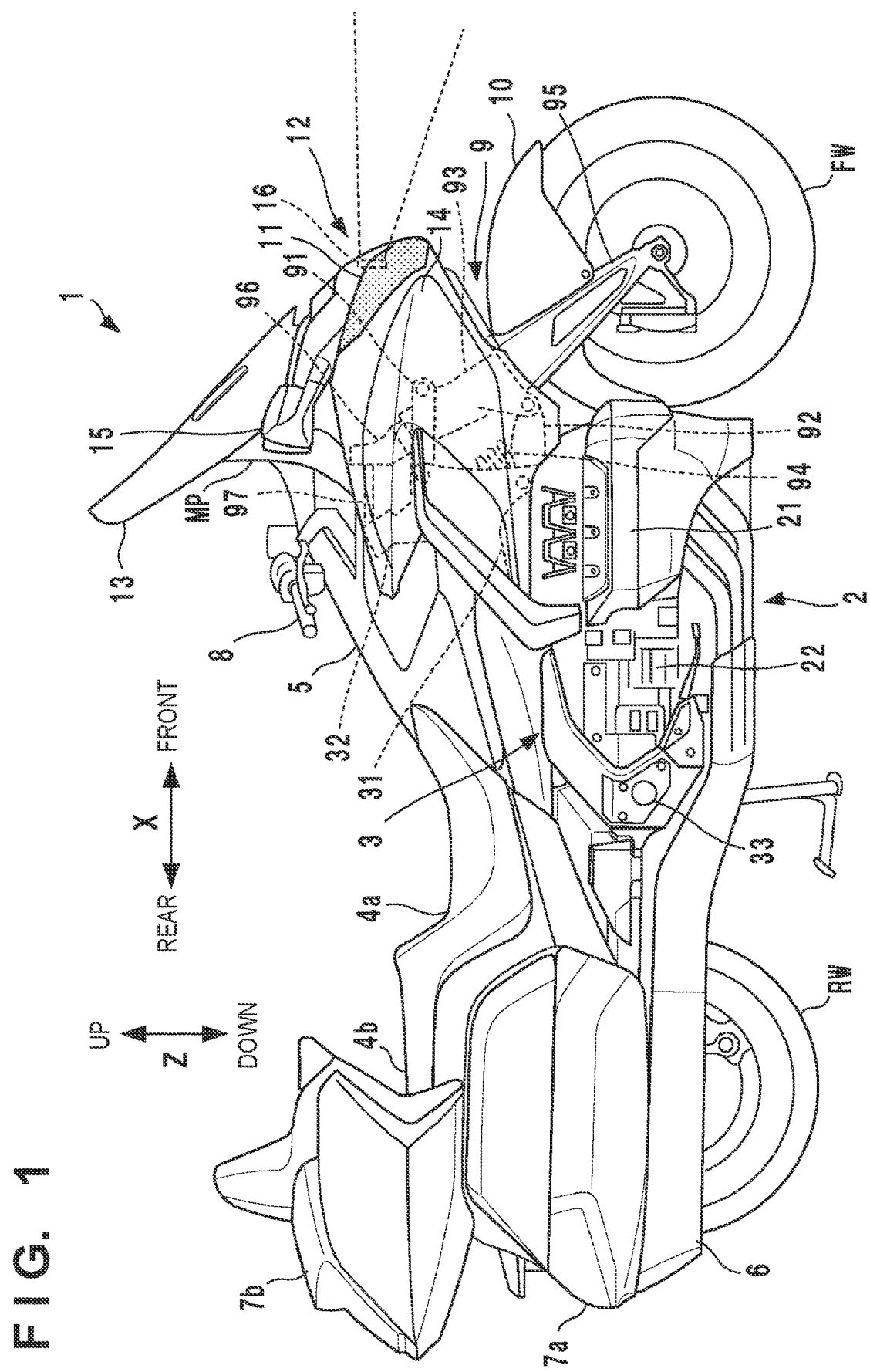
FIG. 1 is a right side view of a straddle type vehicle according to an embodiment of the present invention.
Figure 2:
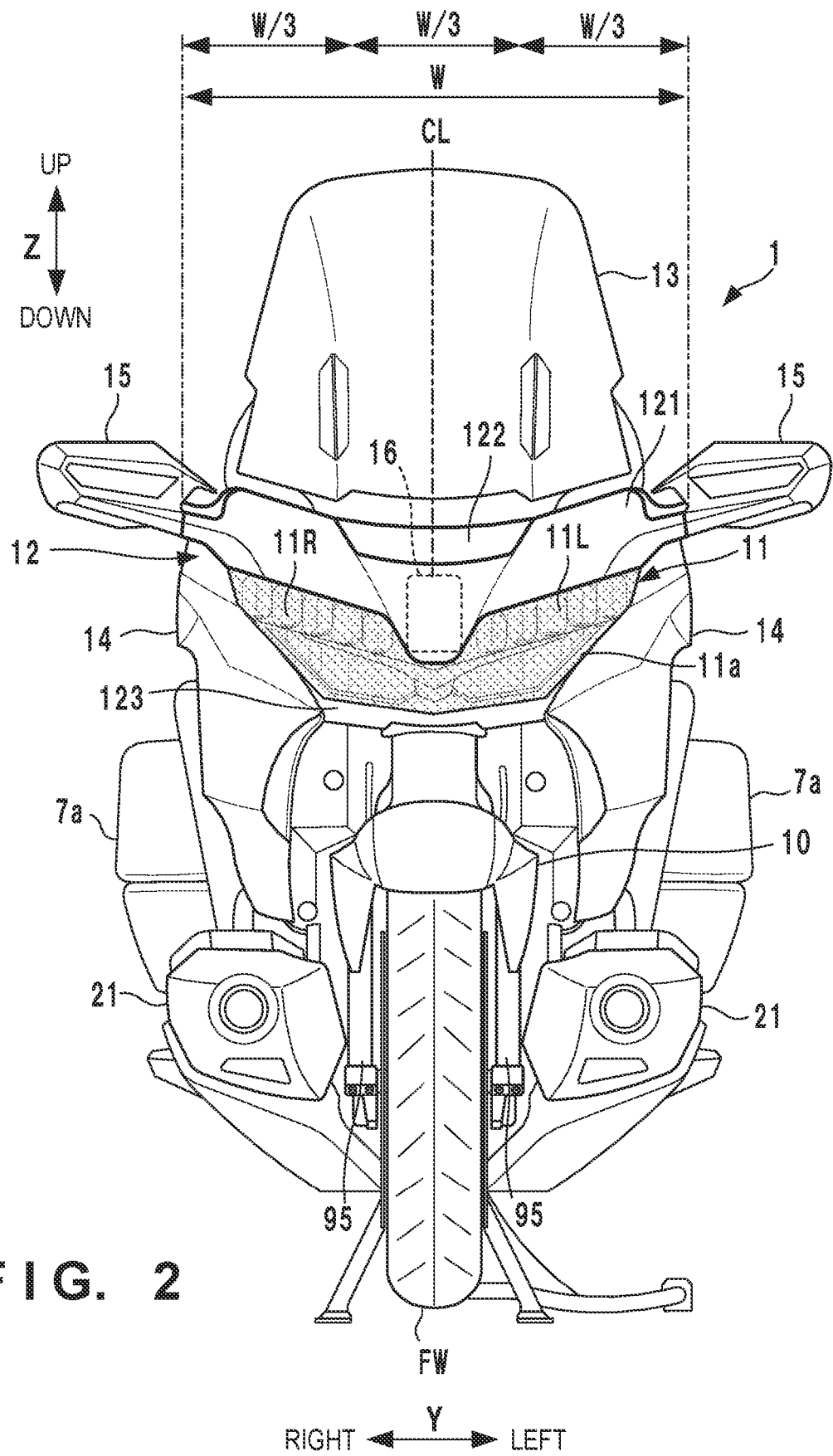
FIG. 2 is a front view of the straddle type vehicle shown in FIG. 1.
Figure 5:
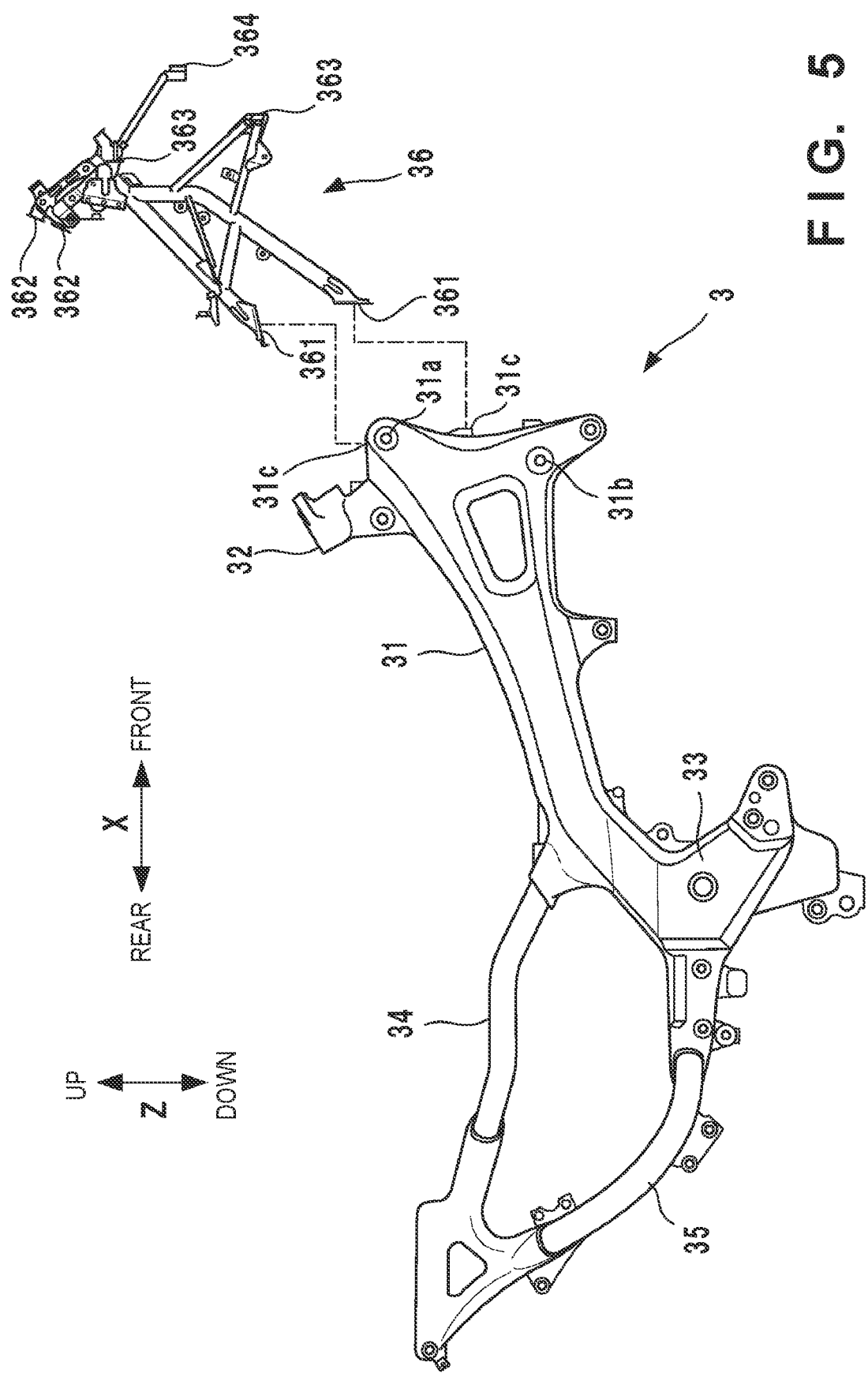
FIG. 5 is an exploded view of a vehicle body frame.

FIG. 1 is a side view of the right side of a straddle type vehicle 1 according to the embodiment of the present invention. FIG. 2 is a front view of the straddle type vehicle 1. FIG. 5 is an exploded view (a right side view) of a vehicle body frame 10 from which some parts are omitted.

The straddle type vehicle 1 is a touring motorcycle suitable for long-distance traveling. However, the present invention is applicable to various kinds of straddle type vehicles including motorcycles of other forms. The present invention is also applicable to a vehicle including an internal-combustion engine as a driving source, and an electric vehicle including a motor as a driving source. In the following description, the straddle type vehicle 1 will sometimes be called the vehicle 1.

The vehicle 1 includes a power unit 2 between a front wheel FW and a rear wheel RW. In this embodiment, the power unit 2 includes a flat-six engine 21 and a transmission 22. The driving force of the transmission 22 is transmitted to the rear wheel RW via a drive shaft (not shown) and rotates the rear wheel RW.

The power unit 2 is supported by a vehicle body frame 3. The vehicle body frame 3 includes a pair of left and right main frames 31 extended in the X direction. A fuel tank 5 and an air cleaner box (not shown) are arranged above the main frames 31. A meter panel MP for displaying various kinds of information to the rider is installed before the fuel tank 5.

A head pipe 32 for pivotally supporting a steerable shaft (not shown) that is pivoted by a handle 8 is attached to the front end portions of the main frames 31. A pair of left and right pivot plates 33 are attached to the rear end portions of the mainframes 31. The lower end portions of the pivot plates 33 and the front end portions of the main frames 31 are connected by a pair of left and right lower arms (not shown), and the power unit 2 is supported by the main frames 31 and the lower arms. In addition, a pair of left and right seat rails 34 extending backward in the rear end portions of the main frames 31 are formed, and support, for example, a seat 4a on which the rider sits, a seat 4b on which a fellow passenger sits, and a rear trunk 7b. The rear end portions of the seat rails 34 and the pivot plates 33 are connected by a pair of left and right sub frames 35.

The front end portion of a rear swing arm (not shown) extending in the front-and-rear direction is swingably supported by the pivot plates 33. The rear swing arm is vertically swingable, and its rear end portion supports the rear wheel RW. An exhaust muffler 6 for silencing the exhaust gas of the engine 21 extends in the X direction in the lower side portion of the rear wheel RW. Left and right saddlebags 7a are formed on the upper side portions of the rear wheel RW.

A front suspension mechanism 9 for supporting the front wheel FW is formed in the front end portions of the mainframes 31. The front suspension mechanism 9 includes an upper link 91, a lower link 92, a fork support member 93, a cushion unit 94, and a pair of left and right front forks 95.

The upper link 91 and the lower link 92 are arranged to be vertically spaced apart from each other in the front end portions of the main frames 31. The rear end portions of the upper link 91 and the lower link 92 are swingably connected to support portions 31a and 31b (FIG. 5) formed in the front end portions of the main frames 31. The front end portions of the upper link 91 and the lower link 92 are swingably connected to the fork support member 93. The upper link 91 and the lower link 92 are arranged to extend in the front-and-rear direction and to be practically parallel to each other.

The cushion unit 94 has a structure in which a shock absorber is inserted into a coil spring, and its upper end portion is swingably supported by the main frames 31. The lower end portion of the cushion unit 94 is swingably supported by the lower link 92.

The fork support member 93 is cylindrical and inclines backward. The front end portion of the upper link 91 is pivotally connected to the upper front portion of the fork support member 93. The front end portion of the lower link 92 is pivotally connected to the lower rear portion of the fork support member 93.

The fork support member 93 supports a steering shaft 96 so that it is rotatable around its axis. The steering shaft 96 has a shaft portion (not shown) inserted into the fork support member 93. A bridge (not shown) is formed in the lower end portion of the steering shaft 96, and supports the pair of left and right front forks 95. The front forks 95 rotatably support the front wheel FW. The upper end portion of the steering shaft 96 is connected to the steerable shaft (not shown) that is pivoted by the handle 8, via a link 97. When the handle 8 is steered, the steering shaft 96 rotates and steers the front wheel FW. The upper portion of the front wheel FW is covered with a fender 10, and the fender 10 is supported by the front forks 95.

<Front Structure>

Figure 3:
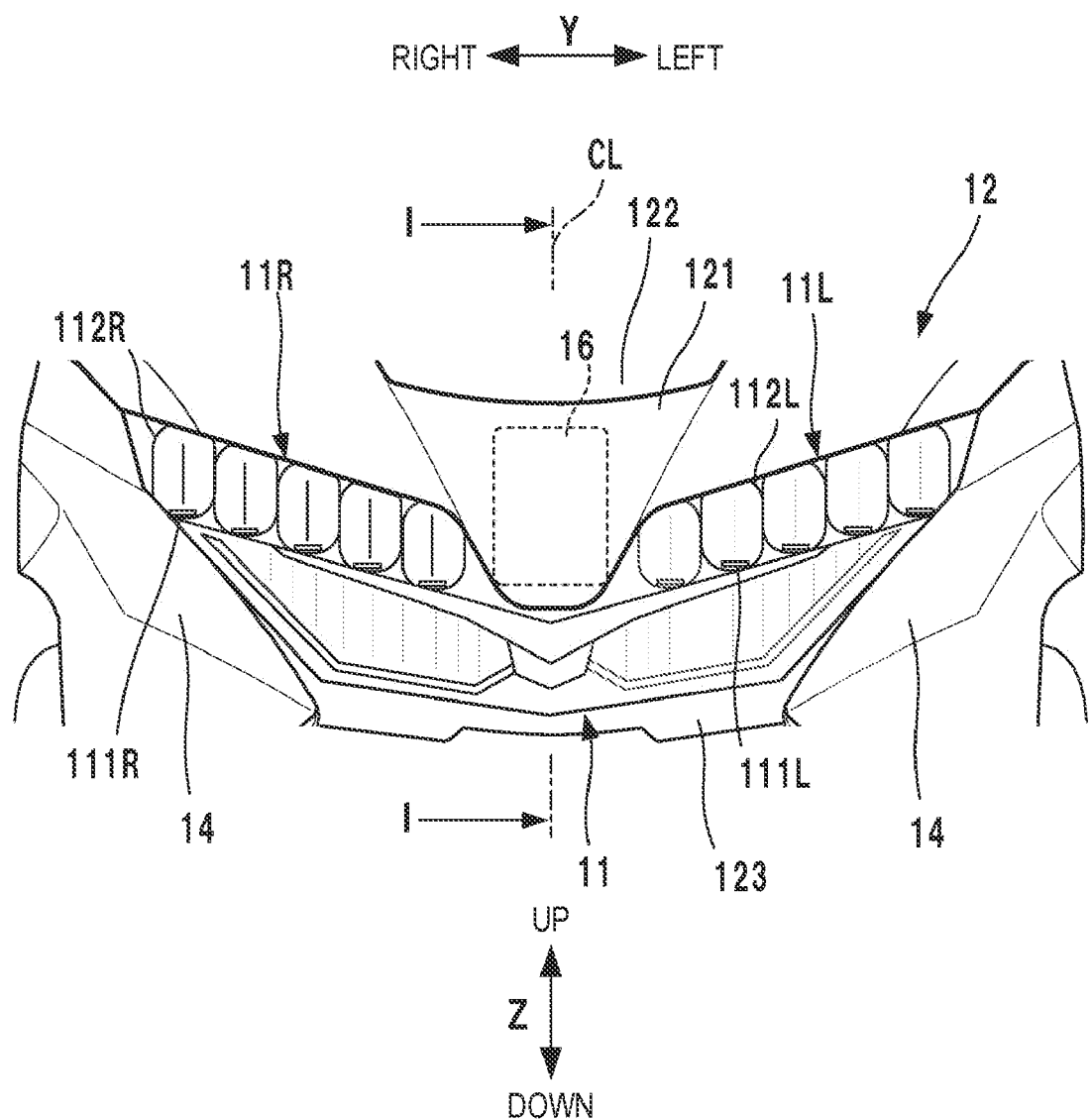
FIG. 3 is an enlarged view of the periphery of a headlight unit.

The front structure of the vehicle 1 will be explained with reference to FIGS. 1, 2, and 3. FIG. 3 is an enlarged view of the periphery of a headlight unit 11 of the vehicle 1. The headlight unit 11 for emitting light ahead of the vehicle 1 is arranged in the front part of the vehicle 1. The headlight unit 11 of this embodiment is a two-lamp headlight unit that symmetrically includes a right-side light emitting unit 11R and a left-side light emitting unit 11L. However, it is also possible to adopt a one-lamp or three-lamp headlight unit, or an asymmetrical two-lamp headlight unit.

The light emitting unit 11R includes a plurality of pairs (five pairs in this example shown in the drawing) of light sources 111R and reflectors 112R. The light source 111R is a light emitting element such as an LED. The reflector 112R is formed to surround the light source 111R from behind the light source 111R, and reflects light emitted by the light source 111R ahead of the vehicle 1. The light emitting unit 11L has the same arrangement such as that of the light emitting unit 11R and includes a plurality of pairs (five pairs in this example shown in the drawing) of light sources 111L and reflectors 112L. The light source 111L is a light emitting element such as an LED. The reflector 112L is formed to surround the light source 111L from behind the light source 111L, and reflects light emitted by the light source 111L ahead of the vehicle 1. A lens member 11a is arranged in front of the headlight unit 11. The lens member 11a is formed by a transparent resin or the like. The lens member 11a of this embodiment is a single member so formed as to cover both the light emitting units 11R and 11L.

The front part of the vehicle 1 is covered with a front cover 12, and the front side parts of the vehicle 1 are covered with a pair of left and right side covers 14. A screen 13 is arranged above the front cover 12. The screen 13 is a windshield for reducing the wind pressure that the rider receives during traveling, and is formed by, for example, a transparent resin member. A pair of left and right sideview mirror units 15 are arranged on the sides of the front cover 12. The sideview mirror units 15 support sideview mirrors (not shown) by which the rider visually confirms the situation behind the vehicle.

In this embodiment, the front cover 12 includes cowl members 121 to 123, and the cowl members form a front cowl. The cowl member 121 extends in the Y direction and forms the main body of the front cover 12. The cowl member 122 forms a portion above the cowl member 121. The cowl member 123 is spaced apart downward from the cowl member 121.

An opening for exposing the headlight unit 11 is formed between the cowl members 121 and 123, and between the pair of left and right side covers 14. The cowl member 121 defines the upper edge of this opening, the cowl member 123 defines the lower edge, and the side covers 14 define the left and right side edges.

A detecting unit 16 for detecting the situation in front of the vehicle 1 is arranged behind the front cover 12. The detecting unit 16 is a radar (for example, a millimeter-wave radar) in this embodiment, but may also be another kind of sensor capable of detecting the front area through the front cover 12. If the detecting unit 16 detects an obstacle before the vehicle 1, it is possible to, for example, cause the meter panel MP to perform display that draws a rider's attention.

In this embodiment, the detecting unit 16 is installed behind the cowl member 121. The existence of the cowl member 121 can make the existence of the detecting unit 16 inconspicuous in the front view of the vehicle 1, and can avoid deterioration of the outer appearance of the vehicle 1. The cowl member 121 is formed by a material capable of transmitting electromagnetic waves, for example, a resin.

The detecting unit 16 is arranged in the central portion of the front cover 12 in the Y direction. As an example of an arrangement like this, FIG. 2 shows an arrangement in which when a width W of the front cover 12 in the Y direction is equally divided into three portions, the detecting unit 16 is arranged such that its center in the Y direction is positioned within the range of W/3 in the center. In this embodiment, the detecting unit 16 is particularly arranged on a central line CL of the front cover 12 in the Y direction. In this embodiment, the central line CL is also the central line of the vehicle 1 in the Y direction.

Since the detecting unit 16 is arranged in the central portion of the front cover 12 in the Y direction, it is possible to obtain a wider detection range across the left and right areas before the vehicle 1, and detect the situation in front of the vehicle 1 without overlooking. Also, one detecting unit 16 can evenly monitor the left and right areas before the vehicle 1. This is particularly advantageous in an arrangement including not a plurality of detecting units 16 but one detecting unit 16.

Furthermore, the shape of the front cover 12 is flatter in the central portion than in the two end portions in the Y direction. Therefore, the detecting unit 16 can easily be arranged behind the front cover 12. This is also advantageous in that the detection surface of the detecting unit 16 can easily be arranged in the target direction with respect to the area in front of the vehicle 1. Also, in this embodiment, the detecting unit 16 is positioned between the light sources 111R and 111L in the front view of the vehicle 1. Therefore, the space between the right and left light sources 111R and 111L can effectively be utilized. In addition, the position of the detecting unit 16 in the Z direction overlaps the positions of the right and left light sources 111R and 111L in the Z direction. This can avoid enlargement of the front part of the vehicle 1 in the Z direction.

Figure 4:
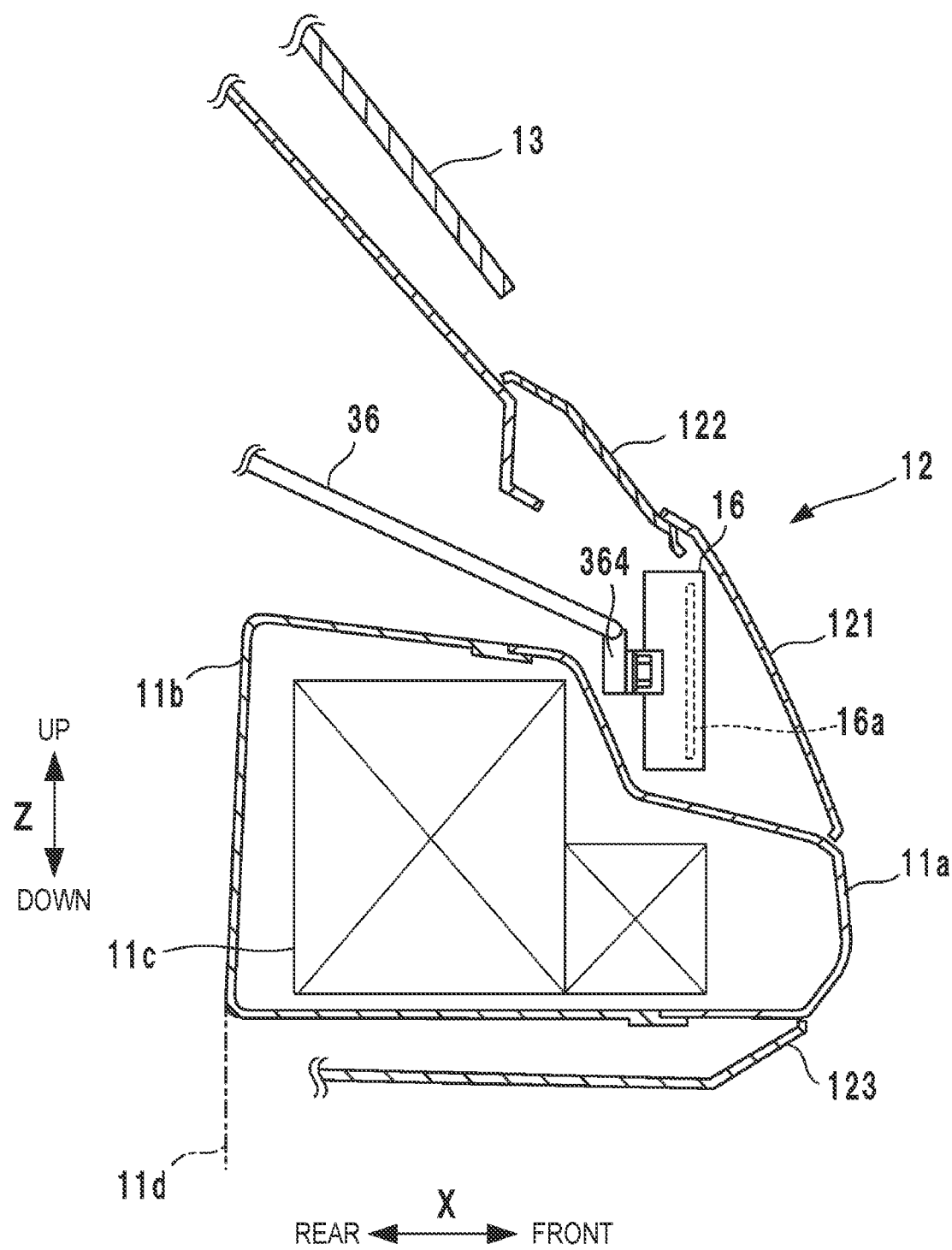
FIG. 4 is a sectional view taken along a line I-I in FIG. 3.

Next, the position of the detecting unit 16 in the X direction and the mounting structure thereof will be explained. FIG. 4 is a sectional view taken along a line I-I (the central line CL) in FIG. 3. The exterior of the headlight unit 11 of this embodiment is formed by the lens member 11a and a housing 11b, and an electric circuit 11d schematically shown in FIG. 4 is arranged in the internal space. The electric circuit 11d includes the light sources 111R and 111L described above, driving circuits for them, and the like.

The detecting unit 16 can also be arranged inside the headlight unit 11. In this case, however, the headlight unit 11 may be enlarged or influenced by heat generated by the electric circuit. In this embodiment, therefore, the detecting unit 16 is arranged outside the headlight unit 11.

The detecting unit 16 of this embodiment has a structure in which a signal transmitter/receiver 16a and other electric circuits (not shown) are accommodated in a boxy housing. The signal transmitter/receiver 16a is, for example, a circuit board on which an antenna for transmitting/receiving electromagnetic waves is formed. The signal transmitter/receiver 16a is arranged so that its substrate surface is almost perpendicular to the X direction. The detection accuracy may decrease if a metal part that obstructs the propagation of an electromagnetic wave is arranged before the signal transmitter/receiver 16a. In this embodiment, the signal transmitter/receiver 16a is positioned before the rear end 11d of the headlight unit 11 in the X direction. This makes it possible to avoid metal parts existing in the headlight unit 11 from interfering with the detection range of the detecting unit 16. To avoid this interference between the detection range of the detecting unit 16 and the metal parts, the signal transmitter/receiver 16a is preferably positioned before the headlight unit 11 as much as possible. The signal transmitter/receiver 16a can be positioned before not only the rear end 11d but also the center of the headlight unit 11 in the X direction. Furthermore, letting L be the length of the headlight unit 11 in the X direction, the signal transmitter/receiver 16a can also be positioned before a position of L/4 from the front end.

In this embodiment, the detecting unit 16 is spaced apart from the front cover 12. In this example shown in FIG. 4, a gap is formed between the detecting unit 16 and the cowl member 121 positioned before that. A viscoelastic member such as rubber or sponge can be installed in this gap. Since the detecting unit 16 is spaced apart from the front cover 12, the vibration of the front cover 12 is not easily propagated to the detecting unit 16. This can prevent a shift of the mounting position of the detecting unit 16, and prevent a change in direction of the detection surface.

Figure 6:
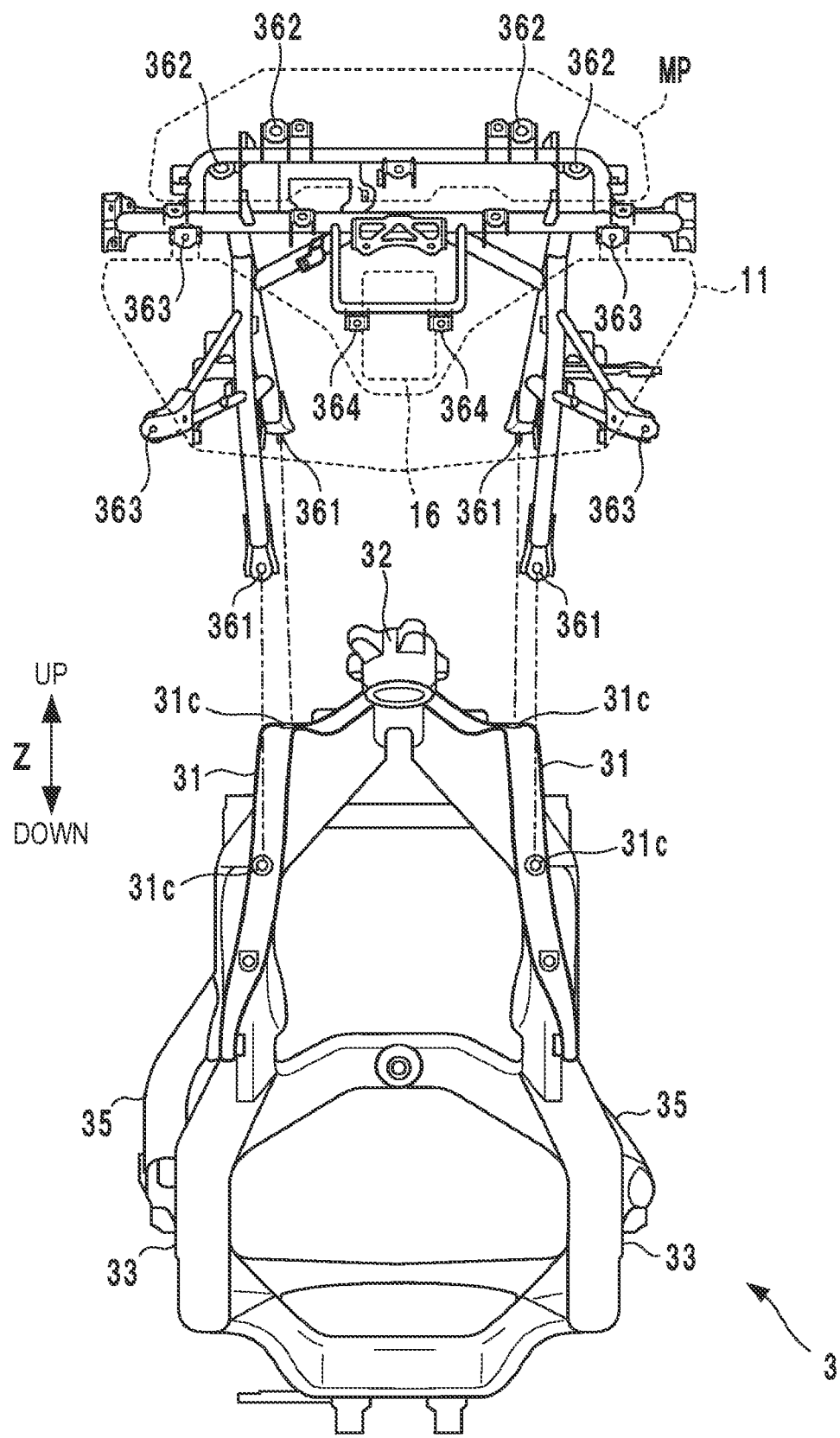
FIG. 6 is an exploded view of the vehicle body frame.

The mounting structure of the detecting unit 16 will now be explained with reference to FIGS. 4 to 6. FIG. 5 is a side view of the right side of a partial arrangement of the vehicle body frame 3 in an exploded state. FIG. 6 is a front view of the partial arrangement of the vehicle body frame 3.

In this embodiment, the detecting unit 16 is supported by the main frames 31. The main frames 31 are members having high rigidity among other members of the vehicle body frame 10. Therefore, the use of the structure in which the detecting unit 16 is supported by the main frames 31 makes it possible to improve the support rigidity of the detecting unit 16, and suppress a shift of the detection range caused when the vehicle 1 is in use.

The detecting unit 16 can directly be fixed to the main frames 31. In this case, however, the degree of freedom of the layout of the detecting unit 16 may decrease, or the degree of freedom of the shape of the main frames 31 may decrease. In this embodiment, therefore, the detecting unit 16 is supported by the main frames 31 via a stay 36.

The stay 36 functions as a fixing stay of each of the meter panel MP, the headlight unit 11, and the detecting unit 16. By using the single stay 36 as the stays of the meter panel MP, the headlight unit 11, and the detecting unit 16, it is possible to reduce the number of parts and improve the assemblability. Note that different fixing stays may also be used for the meter panel MP, the headlight unit 11, and the detecting unit 16. It is also possible to adopt an arrangement in which one fixing stay is used for the meter panel MP and the detecting unit 16, or an arrangement in which one fixing stay is used for the headlight unit 11 and the detecting unit 16.

The stay 36 of this embodiment is formed by fixing plate-like members having bolt fastening holes to a frame body obtained by combining metal pipes. The front end portions of the main frames 31 have four mounting portions 31c to which the stay 36 is fixed. The stay 36 has four mounting portions 361 corresponding to the mounting portions 31c, and corresponding mounting portions 31c and 361 are fixed by bolt fastening.

The upper portion of the stay 36 has four mounting portions 362 to which the meter panel MP is fixed by bolt fastening. The front portion of the stay 36 has four mounting portions 363 to which the headlight unit 11 is fixed by bolt fastening. The central portion of the front portion of the stay 36 has two mounting portions 364 to which the detecting unit 16 is fixed by bolt fastening.

Other Embodiments

Figure 7:
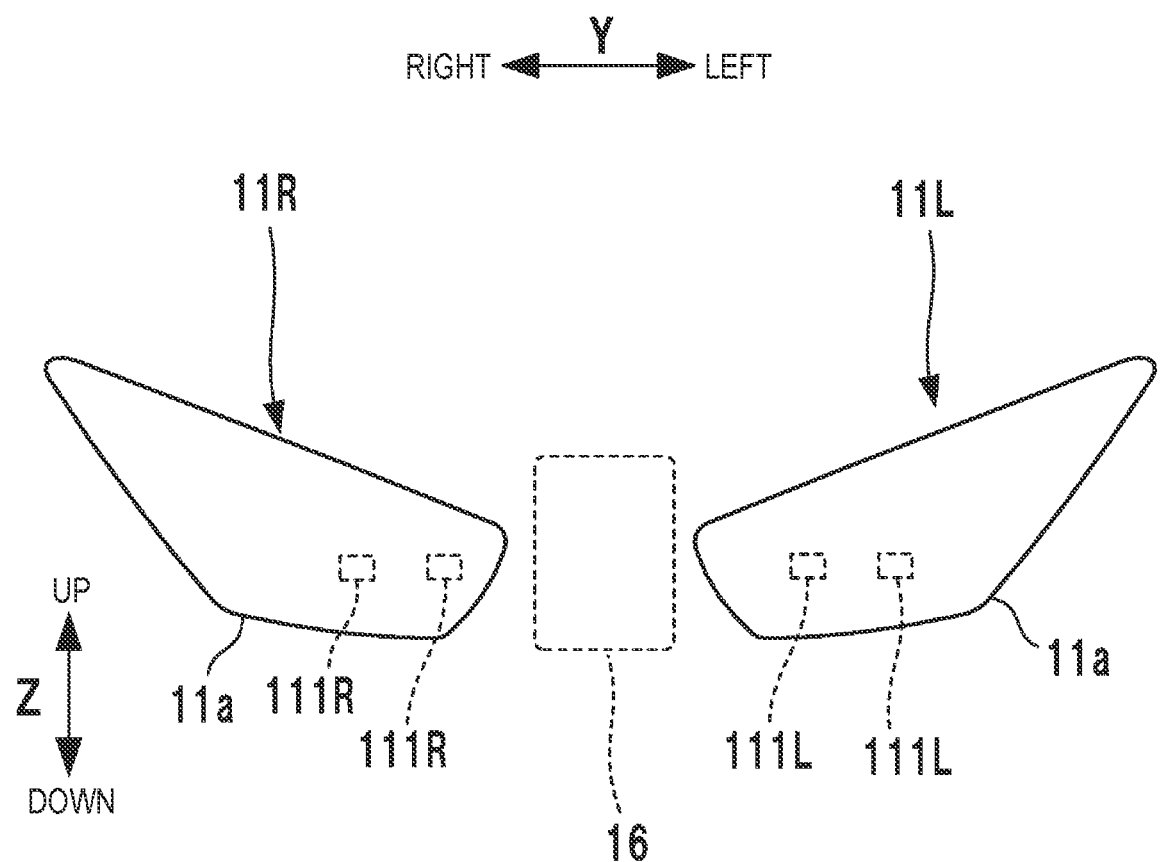
FIG. 7 is a view showing another layout example of a detecting unit.

In the above embodiment, the lens member 11a of the headlight unit 11 is a single member so formed as to cover both the light emitting units 11R and 11L. However, the lens member 11a can also be divided into two members, that is, a member that covers the light emitting unit 11R, and a member that covers the light emitting unit 11L. FIG. 7 shows an arrangement example of the detecting unit 16 when the lens member 11a includes two members. The detecting unit 16 is arranged between the right and left lens members 11a (between the light sources 111R and 111L) in the front view of the vehicle 1. Compared to the example shown in FIG. 3, the position of the detecting unit 16 in the Z direction further overlaps the positions of the right and left lens members 11a or the positions of the light sources 111R and 111L in the Z direction. This can avoid enlargement of the front part of the vehicle 1 in the Z direction as well. Note that the headlight unit 11 may also be independent right and left headlight units instead of an integrated structure of right and left headlight units. In this case, the detecting unit 16 can be arranged between the right and left headlight units.

The present invention is not limited to the above embodiments and various changes and modifications can be made within the spirit and scope of the present invention. Therefore, to apprise the public of the scope of the present invention, the following claims are made.

What is claimed is:

1. A straddle type vehicle comprising:
   a front cover configured to cover a front part of the vehicle; and
   a detecting unit configured to detect a situation in front of the vehicle,
   wherein the detecting unit is arranged behind a central portion of the front cover in a vehicle width direction,
   a gap is formed between the detecting unit and the front cover in a vehicle longitudinal direction, and
   a viscoelastic member is installed in the gap.

2. The straddle type vehicle according to claim 1, further comprising a headlight unit configured to emit light in a forward direction of the vehicle,
   wherein the detecting unit is arranged outside the headlight unit.

3. The straddle type vehicle according to claim 1, further comprising a headlight unit including left and right light emitting units configured to emit light in a forward direction of the vehicle,
   wherein the detecting unit is positioned between a light source of the left light emitting unit and a light source of the right light emitting unit, in a front view of the vehicle.

4. The straddle type vehicle according to claim 2, wherein the detecting unit is a radar, and a signal transmitter/receiver of the radar is positioned in front of a rear end of the headlight unit in a vehicle longitudinal direction.

5. The straddle type vehicle according to claim 3, wherein the detecting unit is a radar, and a signal transmitter/receiver of the radar is positioned in front of a rear end of the headlight unit in a vehicle longitudinal direction.

6. The straddle type vehicle according to claim 1, further comprising a vehicle body frame including a main frame extending in a vehicle longitudinal direction,
   wherein the detecting unit is supported by the main frame.

7. The straddle type vehicle according to claim 6, wherein the detecting unit is supported by the main frame via a stay.

8. The straddle type vehicle according to claim 7, further comprising a headlight unit configured to emit light in a forward direction of the vehicle,
   wherein the stay is a headlight stay that supports the headlight unit.

9. The straddle type vehicle according to claim 7, further comprising a meter unit configured to display information to a rider,
   wherein the stay is a meter stay that supports the meter unit.

10. The straddle type vehicle according to claim 1, further comprising:
    a vehicle body frame including a main frame extending in the vehicle longitudinal direction; and
    a headlight unit configured to emit light in a forward direction of the vehicle,
    wherein the detecting unit is supported by the main frame via a stay,
    the stay including an extending portion, in the vehicle longitudinal direction, above the head light unit, and
    the detecting unit is fixed with a front end portion, in the vehicle longitudinal direction, of the extending portion.

* * * * *